(12) United States Patent
Sadovsky et al.

(10) Patent No.: US 7,623,717 B2
(45) Date of Patent: Nov. 24, 2009

(54) CAPTURING DEVICE FOR EMBEDDING SOFTWARE INTO RAW SENSOR DATA

(75) Inventors: Vladimir Sadovsky, Bellevue, WA (US); Oren Rosenbloom, Redmond, WA (US); Michael D. Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/216,315

(22) Filed: Aug. 31, 2005

(65) Prior Publication Data

US 2007/0168586 A1 Jul. 19, 2007

(51) Int. Cl.
*G06K 9/36* (2006.01)

(52) U.S. Cl. ............... 382/232; 382/119; 382/100; 382/254

(58) Field of Classification Search ......... 710/1–74; 382/100, 224; 348/207.1, 247; 375/240.1; 702/88
See application file for complete search history.

(56) References Cited

U.S. PATENT DOCUMENTS

| | | | |
|---|---|---|---|
| 6,366,692 B1 * | 4/2002 | Acharya | 382/162 |
| 6,535,243 B1 * | 3/2003 | Tullis | 348/207.1 |
| 6,535,618 B1 * | 3/2003 | Rhoads | 382/100 |
| 6,591,009 B1 * | 7/2003 | Usami et al. | 382/165 |
| 6,628,325 B1 * | 9/2003 | Steinberg et al. | 348/211.1 |
| 6,766,263 B1 * | 7/2004 | Stokes | 702/88 |
| 6,785,814 B1 * | 8/2004 | Usami et al. | 713/176 |
| 6,801,999 B1 * | 10/2004 | Venkatesan et al. | 713/167 |
| 6,952,479 B2 * | 10/2005 | Shavit et al. | 380/201 |
| 6,961,441 B1 * | 11/2005 | Hershey et al. | 382/100 |
| 7,009,644 B1 * | 3/2006 | Sanchez et al. | 348/247 |
| 7,046,817 B2 * | 5/2006 | Kamijoh et al. | 382/100 |
| 7,055,034 B1 * | 5/2006 | Levy | 713/176 |
| 7,085,320 B2 * | 8/2006 | Ouyang et al. | 375/240.12 |
| 7,113,596 B2 * | 9/2006 | Rhoads | 380/54 |
| 7,113,614 B2 * | 9/2006 | Rhoads | 382/100 |
| 7,126,629 B1 * | 10/2006 | Braunstein et al. | 348/207.1 |
| 7,171,016 B1 * | 1/2007 | Rhoads | 382/100 |
| 7,171,021 B2 * | 1/2007 | Yoshida et al. | 382/100 |

(Continued)

FOREIGN PATENT DOCUMENTS

EP 1139224 A2 * 10/2001

(Continued)

OTHER PUBLICATIONS

Canon, Canon EOS Digital Camera Instruction Manual, 2003, pp. 1-140.*

(Continued)

*Primary Examiner*—Matt Kim
*Assistant Examiner*—Cheng-Yuan Tseng
(74) *Attorney, Agent, or Firm*—Shook, Hardy & Bacon LLP (57) ABSTRACT

Multimedia and multi-content capture device and integration model. A capture device takes raw sensor data and processes it using a set of algorithms stored on the capture device. A processing device communicates with the capture device to reprocess the raw sensor data using the set of algorithms stored on the capture device. The quality of the output from the capture device and the processing device may differ due to the processing capabilities of each device.

19 Claims, 5 Drawing Sheets

U.S. PATENT DOCUMENTS

| | | | |
|---|---|---|---|
| 7,248,717 B2 * | 7/2007 | Rhoads | 382/100 |
| 7,277,891 B2 * | 10/2007 | Howard et al. | 707/100 |
| 7,287,163 B2 * | 10/2007 | Ogino | 713/176 |
| 7,305,435 B2 * | 12/2007 | Hamynen | 709/203 |
| 7,308,110 B2 * | 12/2007 | Rhoads | 382/100 |
| 7,317,811 B2 * | 1/2008 | Wendt | 382/100 |
| 2001/0047441 A1 * | 11/2001 | Robertson | 710/65 |
| 2002/0194414 A1 * | 12/2002 | Bateman et al. | 710/303 |
| 2003/0081779 A1 * | 5/2003 | Ogino | 380/207 |
| 2003/0149816 A1 * | 8/2003 | Poo et al. | 710/62 |
| 2004/0001631 A1 * | 1/2004 | Camara et al. | 382/224 |
| 2004/0258243 A1 * | 12/2004 | Shin et al. | 380/210 |

FOREIGN PATENT DOCUMENTS

| | | |
|---|---|---|
| JP | 2000209534 A * | 7/2000 |
| JP | 2002232769 A * | 8/2002 |

OTHER PUBLICATIONS

Stair et al. Fundamentals of Information Systems, 2006, Course Technology, 3rd, pp. 4-6.*

Jeita, Exchangable image file format for digital still cameras: Exif Version 2.2, Apr. 2002, pp. 1-154.*

Microsoft, Microsoft Computer Dictionary, 2002, Microsoft, pp. 23 and 489.*

* cited by examiner

CAPTURING DEVICE FOR EMBEDDING SOFTWARE INTO RAW SENSOR DATA

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to the field of computer software, computer hardware, and consumer devices.

BACKGROUND OF THE INVENTION

The digital age has made available many types of personal devices to the average consumer. These personal devices include digital cameras, video cameras, music players, personal digital assistants (PDA), global positioning systems (GPS), and telephones to name a few. Personal devices generate and consume digital content at an enormous rate with the consumer demanding that these devices have more features. The internal capacities of these devices are growing exponentially alongside with processing capabilities but are still lagging in handling content sizes to such devices as computing devices. This problem is made more complicated by the need to control power consumption with personal devices. Consumers are demanding having the best digital content presented to them at the personal device rather than have to transfer information to another device for further processing. For example, today, consumers have to transfer their digital pictures captured on a camera to a computer or printer to see a finished product. Although some cameras have a preview feature, the quality of the digital photo is nowhere near the quality as that of a digital photo provided to the computer or the printer. Even with all three devices, the camera, the computer, and the printer, the digital content has been reduced to a useable format (such as JPEG, BMP, or TIFF) so that these devices can process the resulting photo.

Manufacturers who produce personal devices have to choose between performing rich aggregation of the digital content on the personal device or on another device such as a computing device. In the former case, quality is sacrificed due to limitations such as capacity and power. In the later case, the manufacturer has a growing need to distribute and maintain device-specific drivers in operating systems on different computing devices. If a personal device can carry an encapsulation of algorithms alongside with capture parameters, whereby the algorithms dynamically operate depending on the device, it is possible to perform aggregation of the digital content on the personal device using a set of the algorithms, but also perform rich aggregation of the same digital content on the computing device using the same or subset of the algorithms.

In a first scenario, a digital camera is used with voice capturing ability and GPS. The digital camera captures a series of frames tagged with voice annotations. A user prefers to share the series of frames in a photo-story file. Creating a photo-story file is computationally intensive. The camera firmware can crudely create a photo-story of mediocre quality and limited duration. However, for best results, a computer provides the best quality for processing the sequence of images and voice tags when the data is transferred to it from the camera. The computer has more processing capability as well as storage capacity.

In a second scenario, a digital camera captures sensor data and places it into visible pixel format resulting into digital photographs. The process of digitizing the incoming signal involves a complicated workflow, starting with capturing raw sensor data followed by analog-to-digital conversion and ending with signal processing. In finished form, the digital camera has digital content in an interchangeable format consumable by other devices such as printers and computers. In other words, a user may view, hear, or read the finished form on these other devices. The user wants to view the finished form on the digital camera with the option of transferring the finished form to the printer or computer for further viewing. Unfortunately, the processing abilities of the digital camera is limited coupled with the current technology stripping away much details of the raw sensor data when converting to a digital signal stored on the digital camera. The same is true for an audio signal. When music is captured on an audio device such as an MP3 player, the analog signal is converted and quantized into a digital format stripping away much of the information in order to enable the MP3 player to handle and play the music. However, much of the high fidelity quality of the signal is lost when the raw sensor data is converted into these useable formats.

A better technique would be to transfer the raw sensor data to another device such as a computer to process the data into a finished form maintaining the high fidelity quality. This activity presents new problems whereby a user may have to locate and install the necessary software on the computer to enable the processing of the data on the computer. Furthermore, the user would have to insure the compatibility of the software with the personal device as well as the operating system of the computer. Ultimately, the user may cease to use the product if the ease of use is diminished or involves too much effort.

In both scenarios, the core dilemma remains as to how to provide as much high fidelity as possible into the personal devices without the need for additional or third-party equipment for further processing, but also provide an option to allow the additional or third-party equipment to process information captured on the personal devices to obtain optimal quality without requiring additional software. Today, the choice is either having non-optimal finished digital content using an easy-to-use personal device or having high quality digital content using a complex device that involves copying to and processing at the complex device coupled with installing additional software that has to be maintained.

A method is needed that can process raw sensor data to an output on the personal device rather than convert the raw sensor data into a digital format, but also transfer the raw sensor data to a processing device for further processing using processing steps obtained from the personal device during the transfer without the need to maintain a lot of software on the processing device.

SUMMARY OF THE INVENTION

The present invention generally relates to methods for processing data on a capture device and for processing raw sensor data received at a processing device. The present invention uses software and consumer devices to process raw sensor data into a useable format desired by a user. Software is created that resides on the consumer devices to process raw sensor data to obtain an output. The same software may be transferred to other consumer devices to provide reprocessing of the same raw sensor data to obtain a different output.

In accordance with the present invention, a method for processing data on a capture device is provided that includes capturing information into data in a storage medium on the capture device. Either during the capture phase or after the capture phase, the data is augmented with software algorithms to process the information in the data wherein the software algorithms are embedded into the data to exist concurrently with the information. The information is processed by the software algorithms to an output.

In another aspect, a method for processing data on a capture device is provided that includes capturing information into data in a storage medium on the capture device. Software algorithms stored on the capture device are automatically determined to operate with the information based on the type of data captured. Software algorithms are operated in the capture device to process the information in the data to an output.

In yet another aspect, a method for processing data on a capture device is provided that includes capturing information into data in a storage medium on the capture device. Software algorithms stored on a removable memory device that operates with the capture device are automatically determined to use the information based on the type of data captured.

In yet another aspect, an apparatus having a capture device, a storage device, and an operating environment for processing data into a consumable output is provided that includes the capture device operable with the storage device and the operating environment thereon to record data. The capture devices operates to obtain one or more parameters from the data at least one of during the recording of the data and after the recording of the data to determine one or more software algorithms stored in the storage device to operate on the data, to store one or more device settings and one or more user settings associated with the recorded data, and to execute the determined one or more software algorithms to process the data, one or more device settings, and one or more user settings to the consumable output.

In yet another aspect, a method for processing raw sensor data received at a processing device is provided that includes receiving a set of data at the processing device over a communication connection from a capture device wherein the set of data includes the raw sensor data and software programs. The software programs are detected from the set of data. A subset of the software programs from the capture device are executed on the raw sensor data received from the capture device to process results. The results are provided in a consumable format based on a type of raw sensor data received.

In yet another aspect, a system for processing raw sensor data received at a processing device is provided that includes the processing device in communication with a capture device to transfer the raw sensor data. The processing device operates to receive the raw sensor data and software programs, to execute a subset of the software programs on the raw sensor data to obtain an output wherein the subset is determined based on a processing capability of the processing device and a type of raw sensor data, and to provide the output in a consumable format based on the type of raw sensor data.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention will be better understood from the detailed description provided below and from the accompanying drawings of various embodiments of the invention, which describe, for example, methods for processing data on a capture device and for processing raw sensor data received at a processing device. The detailed description and drawings, however, should not be read to limit the invention to the specific embodiments. Rather, these specifics are provided for explanatory purposes that help the invention to be better understood.

A capture device takes raw sensor information and processes it using a set of algorithms stored on the capture device. A processing device communicates with the capture device to reprocess the raw sensor information using the set of algorithms stored on the capture device. The quality of the output from the capture device and the processing device may differ due to the processing capabilities of each device.

Having briefly described an overview of the present invention, an exemplary operating environment for the present invention is described below.

Exemplary Operating Environment

Figure 1:
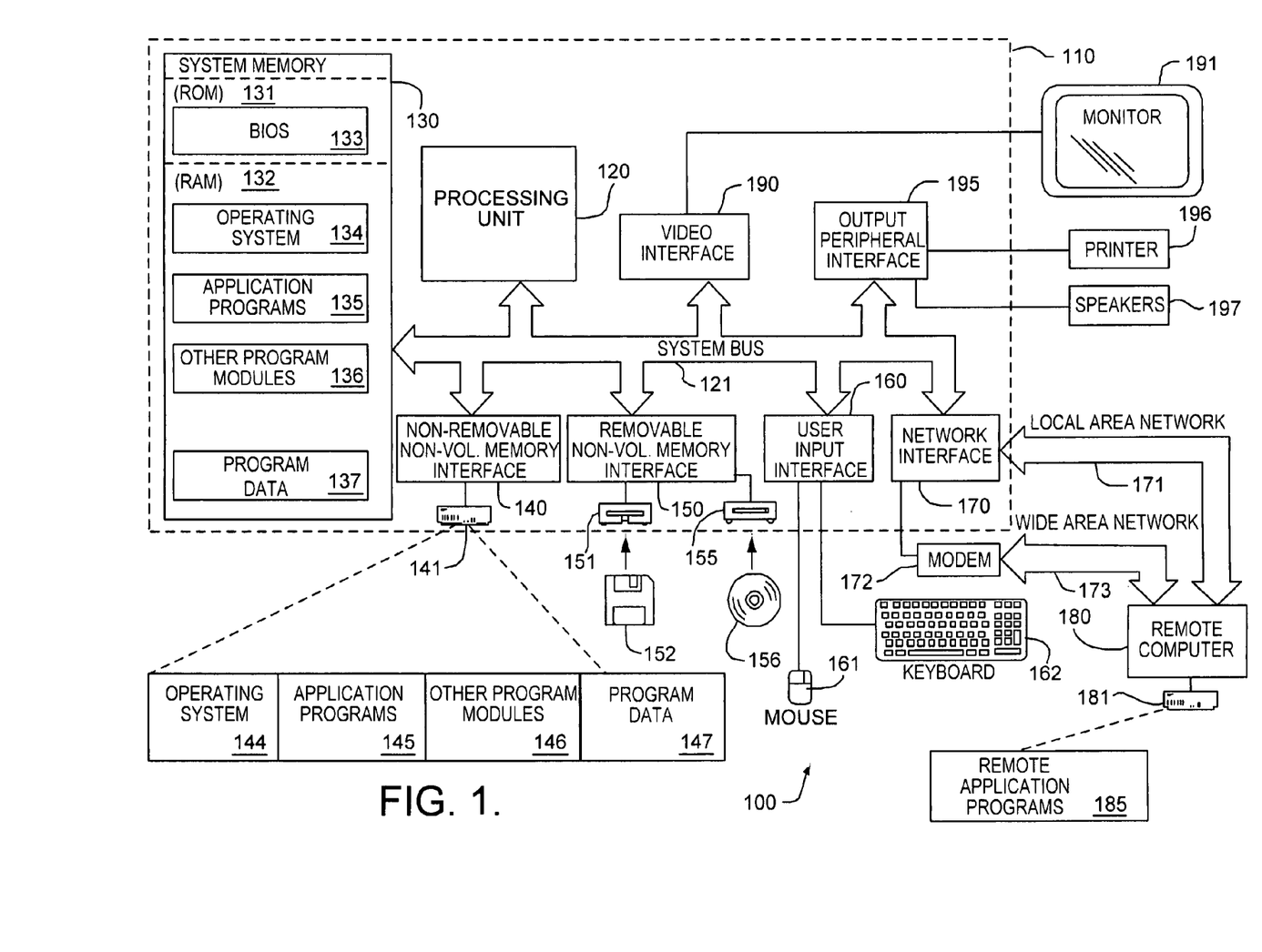
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between the various steps herein disclosed unless and except when the order of individual steps is explicitly described.

Multimedia and Multi-content Capture Device and Integration Model

The present invention applies to digital capture devices where post-processing of the captured content may be performed on a more powerful system upon transfer of the captured content from the digital capture devices into the storage of the system.

For the information in this specification, the terms raw sensor information and raw sensor data include various forms of data that exists prior to the occurrence of processing that may result in data loss or demosaicing. For example, it may include a collection of digital counts coming from an analog-to-digital converter that may be organized or formatted into a variety of methods. In another example, it may include the results from performing lossless processing.

A capture device with an internal memory acquires digitized content with a sensor producing raw sensor information. In some cases, a multimedia device may be capable of capturing multiple types of digital content that describes an event such as an audio and video signal. Along with the raw sensor information, the capture device records device settings and users settings which may become a raw sensor package. The raw sensor package, which may be a combination of multiple streams of digital content, device settings, and user settings, may be stored in the capture device's internal memory for processing or may be recorded on a storage device.

A capture device may need to process digital content immediately to enable on location usage such as previewing photographs. In order to convert raw sensor information into consumable content, a sequence of processing algorithms has to be executed using execution parameters that may be obtained from the raw sensor information. A firmware of the capture device has to balance operations between operating features in the capture device and executing the algorithms to enable a balanced operation of the capture device. The firmware may provide for the recording of raw sensor information on permanent storage, recording capture parameters with the raw sensor information, and obtaining the sequence of processing algorithms to execute on the raw sensor information. The information described above may be shown in FIGS. 2A, 2B, and 2C as follows.

Figure 2A:
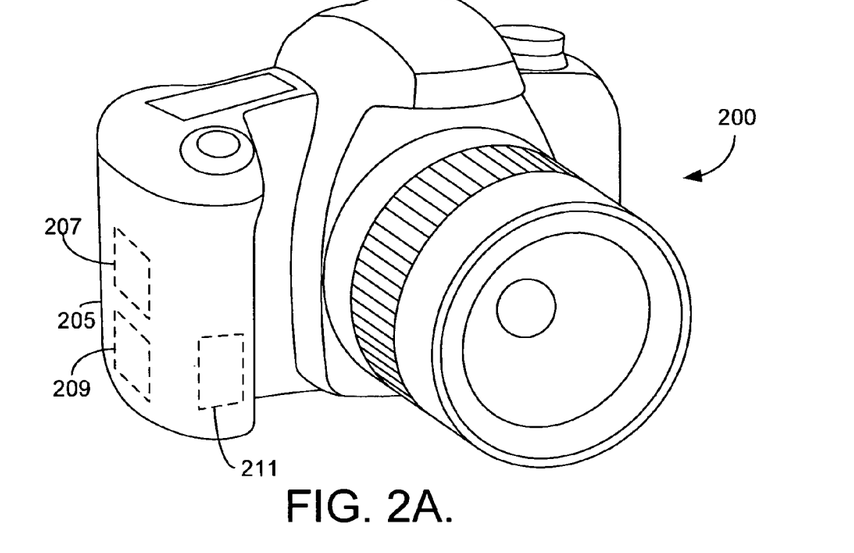
FIG. 2A is a block diagram of an exemplary capture device suitable for practicing an embodiment of the present invention.

In FIG. 2A, a block diagram of a device 200 is shown in the form of a digital camera 205, a software 207, an operating environment 209, and a storage device 211. Digital camera 205 has the ability to capture raw sensor information and store it in storage device 211. Software 207 includes a set of specialized algorithms designed to process the raw sensor information. Software 207 may be managed code, microcode, native code, macro language, micro language, or other computing software designed to work with a device such as digital camera 205. Software 207 may be created using one of the languages mentioned above to contain processing steps to obtain an output from the raw sensor information. The type of output may depend on the processing capability of digital camera 205, device settings and user settings established in operating environment 209, and parameters found in the raw sensor information.

Operating environment 209 controls the functions of digital camera 205. Operating environment 209 may include internal software, hardware, firmware or a combination that facilitates the operation of digital camera 205. Operating environment 209 facilitates the operation of software 207 by providing a platform for software 207 to execute on the raw sensor information.

Storage device 211 provides storage functions for digital camera 205. Storage device 211 may be a permanent storage such as a disk, a temporary memory such as a removable memory device, or any other device that functions to store information and operate either with or as part of digital camera 205. Storage device 211 may also be a combination of storage capabilities. For example, operating environment 209 may reside on a permanent disk while the raw sensor information may reside in memory. Alternatively, the raw sensor information may reside with operating environment 209 on the permanent disk.

In one embodiment of the present invention, as the raw sensor information is captured in digital camera 205, operating environment 209 may embed software 207 into the raw sensor information along with device setting and user settings to create the raw sensor package. This package would contain the executable routines from software 207, the original raw sensor information, device settings, and user settings. At this point, the raw sensor package, facilitated by operating environment 209, may self-execute to process the raw sensor information to obtain an output. The type and quality of the output might depend on the processing limitations of digital camera 205 as well as the device settings and user setting that were established. With digital camera 205, it would be possible to provide the output as digital photographs, streaming video, or multimedia.

In another embodiment of the present invention, similar to the discussion above, the raw sensor information may be placed in storage device 211 while software 207 is placed in the firmware of digital camera 205. Operating environment 209 may facilitate the execution of software 207 with the raw sensor information to obtain the output discussed above.

In yet another embodiment of the present invention, similar to the discussion above, the raw sensor information may be placed in storage device 211 while software 207 is placed in a removable memory device. Likewise, both the raw sensor information and software 207 may be placed on the removable memory device depending on the implementation of the embodiment of the present invention. The removable memory device may function as an optional piece of hardware lessening the processing burden and power consumption on digital camera 205 when not in use. When the removable memory device is in use, operating environment 209 may facilitate the execution of software 207 with the raw sensor information to obtain the output.

Digital camera 205 illustrates an exemplary digital device to capture raw sensor information implementing several embodiments of the present invention. However, other exemplary devices may be used to implement other embodiments of the present invention as may be seen in FIGS. 2B and 2C.

Figure 2B:
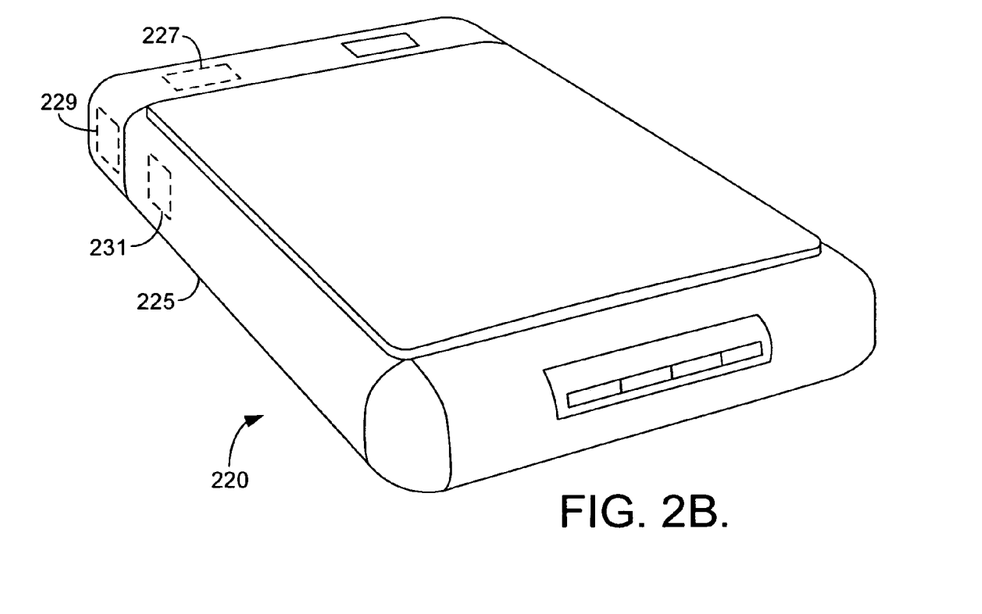
FIG. 2B is a block diagram of an exemplary capture device suitable for practicing an embodiment of the present invention.

In FIG. 2B, a block diagram of a device 220 is shown in the form of a scanner 225, a software 227, an operating environment 229, and a storage device 231. The details that were described for digital camera 205 in FIG. 2A are applicable to scanner 225. The raw sensor information may be captured during the scanning process. Software 227 functions like software 207 to execute processing steps on the raw sensor information to provide the output. Operating environment 229 controls the functions and features within scanner 225 and facilitates the processing that may occur to obtain the output from the processed raw sensor information. Storage device 231 functions similar to storage device 211 in FIG. 2A. Scanner 225 may incorporate a viewing display, but also may provide the output to another device such as a display monitor.

The raw sensor information and the output for scanner 225 may be different from the raw sensor information and the output for digital camera 205 since the technology for both devices are different. However, the present invention remains the same with regards to both, capturing the raw sensor information and the software algorithms residing on the devices to provide processing of the raw sensor information. As a result, the present invention may be implemented on various digital devices.

Figure 2C:
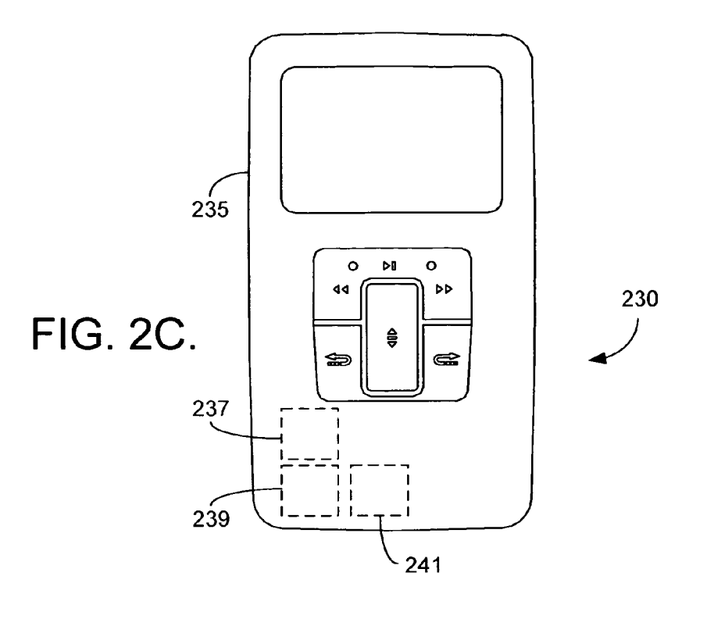
FIG. 2C is a block diagram of an exemplary capture device suitable for practicing an embodiment of the present invention.

Turning now to FIG. 2C, a block diagram of a device 230 is shown in the form of a music player 235, a software 237, an operating environment 239, and a storage device 241. As established above that the raw sensor information is digital content, the raw sensor information for music player 235 is digital content for the music that has been recorded or captured without additional processing taking place. The raw sensor information may be handled as was described in FIGS. 2A and 2B to be processed by software 237 facilitated by operating environment 239 using storage device 241. The output may be an enhanced audio or some other form of output as desired by the user.

For the following discussion, a reference shall be made to the previous devices and other types of consumer devices as capture devices.

When a capture device is connected to a processing device such as a computer, the processing device acquires digital content from the capture device. The processing device may run a content acquisition engine that may communicate with the capture device via a standard data exchange protocol like the Media Transfer Protocol (MTP) or may directly access digital content through a storage medium such as a flash card or a removable memory device. The content acquisition engine loads into the storage of the processing device the raw sensor information, executable software algorithms, device settings, and user settings from the capture device. This loaded information may reside in a module on the processing device or may be stored in various locations depending on the operating environment. If post-processing needs to be performed, the content acquisition engine identifies the routines from the executable software algorithms that need to be executed on the raw sensor information. In one embodiment of the present invention, the executable software algorithms may be kept in a special environment in the processing device to isolate it to executing only on special routines. This isolation may prevent unauthorized execution of the software algorithms. Upon completion of the post-processing, the output may be provided to the user. In some cases, this output may replace the output created by the capture device since the processing device may have more processing capability to produce a higher quality output. The idea here is to convey that the capture device and the processing device may both use the same executable software algorithms to process the same raw sensor information but the processing device may provide a richer aggregation of the output. The information described above may be shown in FIG. 3.

Figure 3:
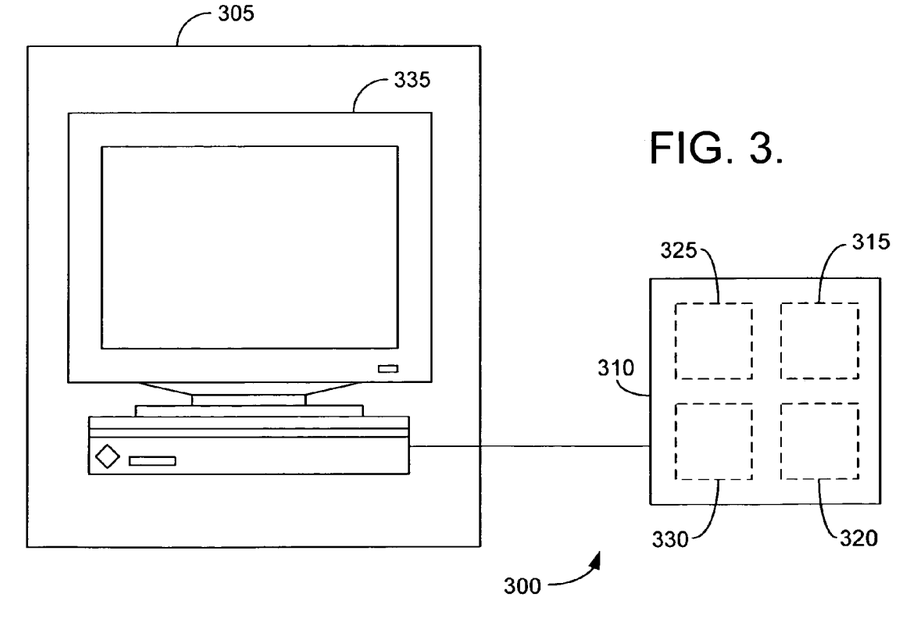
FIG. 3 is a block diagram of an exemplary processing device and capture device suitable for practicing an embodiment of the present invention.

In FIG. 3, an exemplary integration model 300 is shown with a processing device 305 and a capture device 310. For an embodiment of the present invention, processing device 305 may be a computer, printer, workstation, facsimile machine or other device that may receive information from another device. Capture device 310 may include a software 315 similar to software 207, software 227, and software 237; an operating environment 320 similar to operating environment 209, operating environment 229, and operating environment 239; a storage device 325 similar to storage device 211, storage device 231, and storage device 241; and a raw sensor package 330.

Raw sensor package 330 contains the combination of the raw sensor information, device settings, and user settings. All of the items listed in raw sensor package 330 do not have to be present. However, the raw sensor information must at least be present to operate in an embodiment of the present invention. As shown in FIG. 3, raw sensor package 330 may be transferred to processing device 305 over a communication connection for further processing. Processing device 305 may take raw sensor package 330 with software 315 to process the output as discussed above. Processing device 305 may provide the output to display 335. One ordinarily skilled in the art may appreciate that there are several ways to provide outputs other than display 335. If processing device 305 is a printer, the output may be a photograph on paper. The output may also be an audio rendition of the raw sensor information captured by a music player. Hence, display 335 might be a speaker rather than a viewing device.

To better understand the present invention, two processes for making and using the present invention shall be discussed below in the figures.

Figure 4:
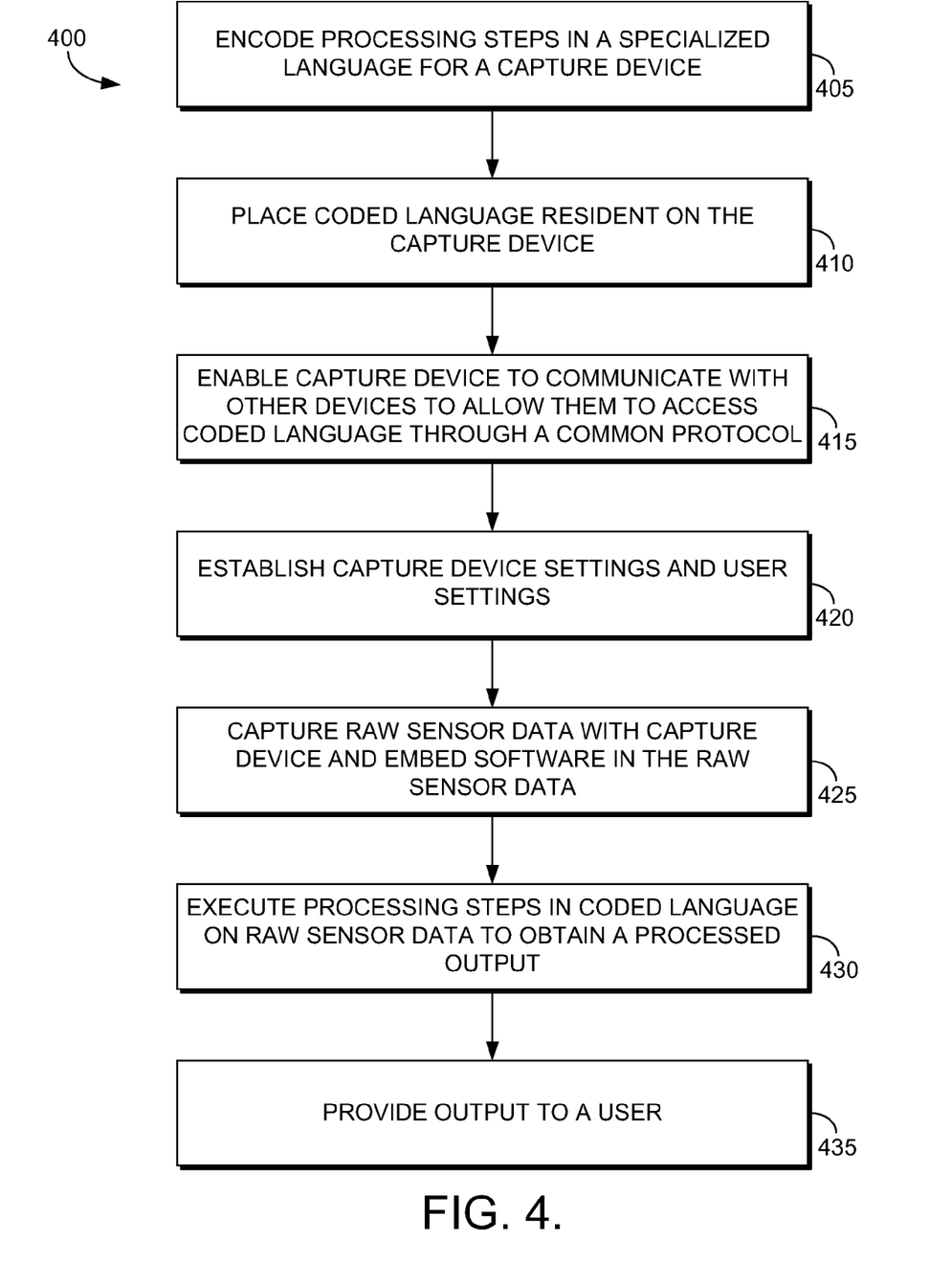
FIG. 4 is a flowchart illustrating an exemplary process for processing raw sensor data on a capture device in accordance with an embodiment of the present invention.

In FIG. 4, a method 400 is provided for processing raw sensor information on a capture device. In a step 405, processing steps are encoded into a specialized language to reside on the capture device. The specialized language was referred to earlier as software 207, 227, 237, and 315 in FIGS. 2A, 2B, 2C, and 3. The specialized language may be determined by a vendor but may reside in a module so that it may be isolated from other software residing on the capture device. The specialized language is placed on the capture device in a step 410. Also, a vendor may enable the capture device to communicate with other devices to allow them to access the specialized language through a common protocol, a step 415.

Before or during the operation of the capture device, device settings and user settings may be established by the vendor or a user in a step 420. During operation, raw sensor information may be captured into the capture device in a step 425. The specialized language within the capture device executes processing steps on the raw sensor information to obtain a processed output in a step 430. The output is provided to the user in a step 435.

Figure 5:
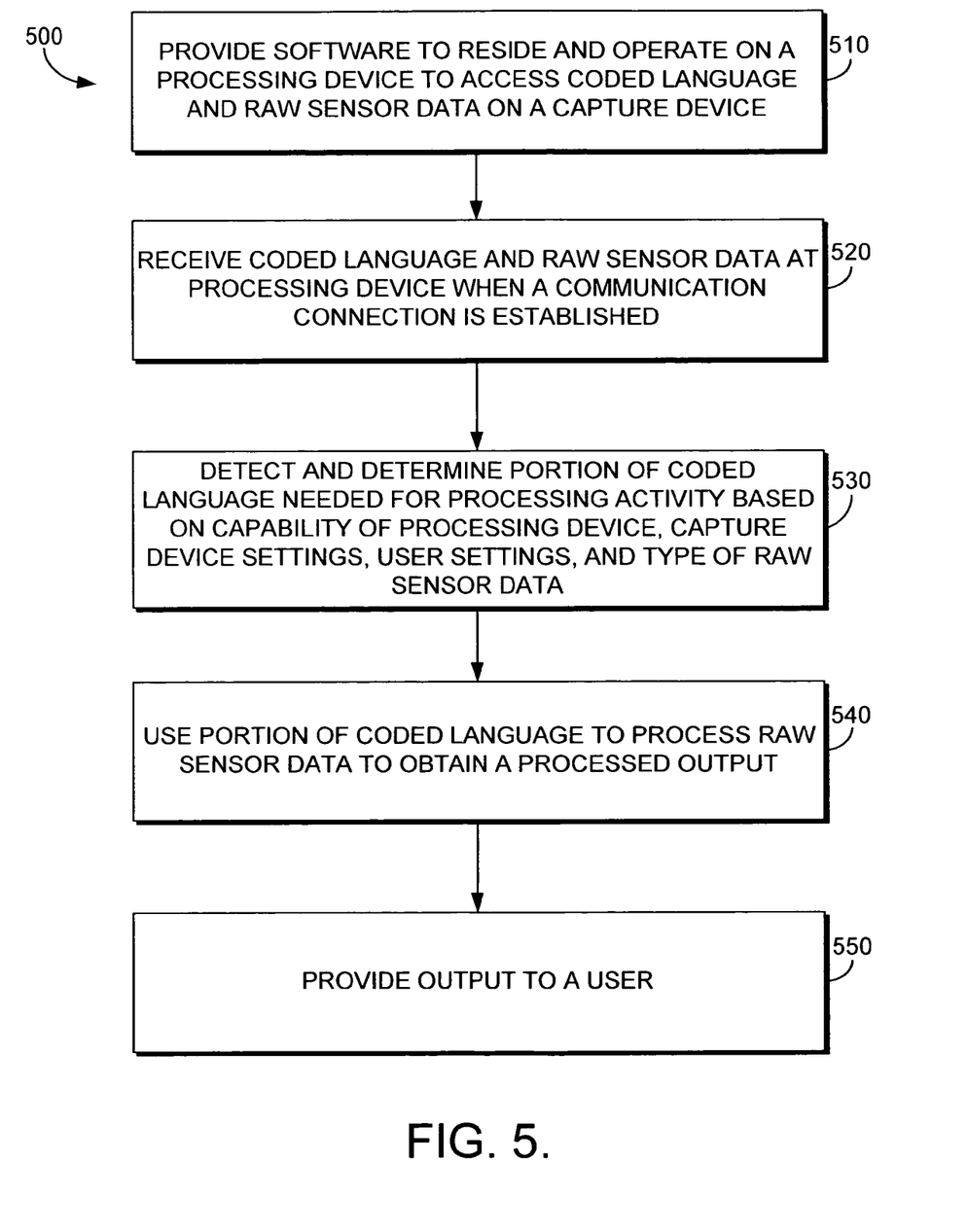
FIGS. 5 is a flowchart illustrating an exemplary process for processing raw sensor data on a processing device in accordance with an embodiment of the present invention.

Turning now to FIG. 5, a method 500 is provided for processing raw sensor information on a processing device. In a step 510, software is provided to reside and operate on processing device 305 to access a coded language and raw sensor information on a capture device. The software may be the content acquisition engine discussed above. The coded language and raw sensor information is received at the processing device when a communication is established with the capture device, in a step 520 and as shown in FIG. 3. In a step 530, processing device 305 may detect and determine a subset of the coded language to use for processing activity based on a capability of the processing device, capture device settings, user settings and the type of raw sensor information. This step is provided since the processing steps used by processing device 305 to process the raw sensor information may be different from the processing steps executed by the capture device to process the same raw sensor information.

With various information located at processing device 305, processing device 305 may use the subset of the coded language to process the raw sensor information to obtain a processed output in a step 540 similar to step 430. The output is provided to a user in a step 550 similar to step 435.

One ordinarily skilled in the art may appreciate that the steps in FIG. 4 and 5 may be executed without regard to the order shown. For example, step 420 may be executed after step 425 while step 415 may be executed before step 410.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for processing data on a capture device, comprising:
    capturing raw sensor data in a storage medium on the capture device, wherein raw sensor data is data that exists prior to the occurrence of processing that may result in data loss or demosaicing;
    during one or more of a capture phase and after the capture phase embedding one or more software programs into the raw sensor data to exist concurrently with the raw sensor data, and wherein the one or more software programs, when executed, process the raw sensor data; and
    storing a raw sensor package in the storage medium on the capture device, wherein the raw sensor package includes the one or more software programs embedded in the raw sensor data.

2. The method of claim 1, wherein the one or more software programs reside in at least one of the capture device and a removable memory device that operates with the capture device.

3. The method of claim 1, further comprising capturing different types of content simultaneously into separate raw sensor data components to each be processed by the one or more software programs, wherein the separate raw sensor data components are included in the raw sensor package.

4. The method of claim 1, further comprising embedding one or more capture device settings and one or more user settings in the raw sensor package.

5. The method of claim 1, further comprising replacing a set of the one or more software programs with at least one of another software program, a plug-in, and a scripting mechanism.

6. A computer storage medium having instructions stored thereon for performing the method of claim 1.

7. An apparatus having a capture device, containing a storage device an operating environment for processing data to generate a consumable output, comprising:
    the capture device operable with the storage device and the operating environment thereon to record raw sensor data, wherein raw sensor data is data that exists prior to the occurrence of processing that may result in data loss or demosaicing;
    the capture device operable to obtain one or more parameters from the raw sensor data to select one or more software programs stored in the storage device capable of processing the raw sensor data when executed;
    the capture device operable to store one or more device settings and one or more user settings associated with the recorded raw sensor data; and
    the capture device operable to embed the selected one or more software programs and the one or more device settings in the raw sensor data to create a raw sensor package.

8. The apparatus of claim 7, wherein the raw sensor data includes an audio component and an image component.

9. A method for processing raw sensor data received at a processing device, comprising:
    at the processing device, receiving a set of data over a communication connection from a capture device wherein the set of data includes one or more software programs embedded in the raw sensor data to exist concurrently with the raw sensor data, wherein the raw sensor data is data that exists prior to the occurrence of processing that may result in data loss or demosaicing, and the one or more software programs are self-executable to process the raw sensor data to obtain an output;
    detecting the one or more software programs from the set of data;
    executing a subset of the one or more software programs received from the capture device embedded in the raw sensor data received from the capture device to generate one or more results; and
    providing the one or more results in a consumable format based on a type of raw sensor data received.

10. The method of claim 9, wherein executing the subset of the one or more software programs comprises determining the subset of the one or more software programs to execute based on a processing capability of the processing device and the type of raw sensor data to be processed.

11. The method of claim 10, wherein the one or more software programs include a set of processing steps associated with the capture device and the raw sensor data.

12. The method of claim 11, wherein the one or more software programs are selected from the group consisting of managed code, microcode, native code, macro language, and micro language.

13. The method of claim 10, further comprising receiving one or more capture device settings and one or more user settings from the capture device to be used by the subset of the one or more software programs wherein the subset of the one or more software programs uses the one or more capture device settings and the one or more user settings to process the raw sensor data.

14. The method of claim 10, further comprising replacing one or more portions of the one or more software programs with at least one of another software program, a plug-in, and a scripting mechanism.

15. A computer storage medium having instructions stored thereon for performing the method of claim 9.

16. A computer system having a processor a memory, and an operating environment, the computer system operable to execute the method as recited in claim 9.

17. The method of claim 10, wherein the raw sensor data captures audio content.

18. The method of claim 10, wherein the raw sensor data captures video content.

19. The method of claim 1, wherein the raw sensor data captures at least one of audio and video content.

\* \* \* \* \*